United States Patent [19]

de Souza

[11] 3,907,656

[45] Sept. 23, 1975

[54] PROCESS FOR ULTRAVIOLET PIGMENTED HARDENING OF PIGMENTED PAINT FILMS

[75] Inventor: Antonio de Souza, Akron, Ohio

[73] Assignee: SCM Corporation, New York, N.Y.

[22] Filed: May 24, 1974

[21] Appl. No.: 472,980

Related U.S. Application Data

[63] Continuation-in-part of Ser. No. 197,981, Nov. 11, 1971, abandoned.

[52] U.S. Cl.. 204/159.16; 204/159.14; 204/159.19; 204/159.23; 204/159.24; 260/42.28; 260/42.52; 260/2.5 B; 260/834; 260/837 R; 260/836; 427/54

[51] Int. Cl.$^2$... C08F 8/00; C08G 18/00; C08F 2/46

[58] Field of Search..... 204/159.22, 159.23, 159.24, 204/159.19, 159.13, 159.16, 159.15; 200/2.5 B; 117/93.31

[56] References Cited

UNITED STATES PATENTS

| | | | |
|---|---|---|---|
| 2,900,277 | 8/1959 | Schmitz et al. | 204/159.15 |
| 2,921,006 | 1/1960 | Schmitz et al. | 204/159.15 |
| 3,552,986 | 1/1971 | Bassemir et al. | 204/159.15 |
| 3,650,669 | 3/1972 | Osborn et al. | 204/159.14 |

FOREIGN PATENTS OR APPLICATIONS

| | | |
|---|---|---|
| 856,861 | 11/1970 | Canada |

*Primary Examiner*—Richard B. Turer
*Attorney, Agent, or Firm*—Thomas M. Schmitz

[57] ABSTRACT

Cure of a paint film having a binder that is polymerizable by irradiation is improved by providing entrapped opacifying gas bubbles within the paint film. The opacifying entrapped gas bubbles can replace some of the opacifying pigment, such as titania, in addition to substantially improving the rate of ultraviolet energy cure.

1 Claim, No Drawings

PROCESS FOR ULTRAVIOLET PIGMENTED HARDENING OF PIGMENTED PAINT FILMS

BACKGROUND OF THE INVENTION

This is a continuation-in-part of Ser. No. 197,981 filed Nov. 11, 1971, and now abandoned and incorporated herein by reference.

This invention relates to an improvement in process for ultraviolet energy curing (hardening) an opacified paint film having a binder that is polymerizable when irradiated with ultraviolet energy radiation. Curing (hardening) herein connotes the obtaining of a finish that is practical for ordinary use and is tack free.

Paint in this specification is used in the usual sense of the word, namely, a fluent liquid-phase continuous or powdery mixture of opacifying pigment, optionally with added colorants and fillers, and a binder (vehicle) therefor, the mixture being adapted for use as a surface coating. Such paint also can have various other conventional additives such as pesticides, odorants, flow-control agents, and like additives to paints.

Irradiation of the paint film with ultraviolet energy indicates irradiation from ultraviolet energy source emitting wavelengths in the ultraviolet spectrum and generally considered to be between 1,600 A and 4,000 A. Useful ultraviolet radiation for the instant invention can come from laser apparatus having monochromatic output within the ultraviolet range and disclosed in copending Ser. No. 189,254 filed Oct. 14, 1971, or apparatus having broader spectrum, such as plasma-arc torch apparatus (PARS) disclosed in U.S. Pat. No. 3,364,387 and special electric lamps having lower wattage ultraviolet output. The foregoing references are incorporated herein by reference.

Prior to this invention, pigmented paints were often very difficult or impractical to cure with ultraviolet energy radiation and obtain a thorough and complete cure. Pigmented paint films resist a deep penetrating cure and will often encounter scratching or other disruption when handled or used, particularly when such films are about a half mil thick or thicker. A lack of penetrating cure can be attributed to absorption of some of the ultraviolet curing energy into the pigment, or perhaps reflection of ultraviolet energy, or refraction or blocking of ultraviolet energy thereby preventing a thorough cure of the paint film.

It now has been found that opacified paint films can be rapidly and efficiently cured with ultraviolet energy by providing at least 25% of the opacification of the paint film with the inclusion of preformed gas bubbles entrapped within the paint film. Paint films containing entrapped gas are particularly susceptible to ultraviolet energy radiation as well as providing a portion of the necessary opacification to pigmented paint films.

Accordingly, a primary object of this invention is to provide a substantially improved process for ultraviolet curing of paint films by the inclusion of entrapped gas bubbles within a paint film resulting in the saving of energy, economy, weight saving, as well as completeness of practical cure with attendant opacification.

A further advantage of curing with this ultraviolet radiation is that the paint film has less sensitivity in the coating to under- or overcure.

A further advantage is that the low temperature ultraviolet curing process results in attendant suppression of losses from volatilization of film components, suppression of discoloration or degradation of the film, avoidance of shrinkage and distortion (preservation of dimensional stability) of the substrate, suppression of degradation of the substrate to which the film is applied. Useful substrates include metal, mineral, glass, wood, masonry, ceramic, plastic such as synthetic resins, fabric, and like substrates.

The art describes several ways of so entrapping opacifying gas bubbles within the paint film. Entrapped opacifying gas bubbles are preferably preformed in the paint film by the inclusions of particles having hollow interiors such as glass microballoons or vesiculated irregular edges such as shown in Canada Pat. No. 856,861 and incorporated herein by reference. The vesiculated particles can be irregular microspheres or chunks of polymer or tiny pieces of porous minerals which generally are adapted to entrap gas bubbles within the paint film. British Pat. No. 1,192,492 suggests cellular particulate matter containing cells between 0.01 micron and 30 microns which prevent film-forming binder from entering the cells thus causing a preformed entrapped gas bubble within the paint film, and said patent is incorporated herein by reference. Differences in the index of refraction between the entrapped gas, which is generally air, and the cured vehicle provides the opacification (as does such difference between an opacifying pigment and such vehicle). Optical opacity of films is achieved either by absorption of the incident light or by scattering of the incident light, or a combination thereof.

Not all the opacifying pigment of the paint needs to be replaced, although in some cases this can be done. The degree of opacification provided by the entrapped gas bubbles can be estimated by comparing the gas-opacified film with one of like thickness made from a like formulation, but with a standard higher amount of opacifying pigment and no such gas opacification. If the bubble-opacified formulation has only 50% of the opacifying pigment per unit of film thickness that the standard comparative formulation has, the opacification from the gas bubbles is considered to be 50%. Similarly, if 35% of the standard for opacification is attributed to opacifying pigment, then 65% opacification is attributed to entrapped gas bubbles. At least roughly 25% of the opacification by entrapped gas bubbles is needed in the practice of the instant invention to give appreciable improvement in curing performance. Preferably, between about 25 to 95% of the opacification is provided by the preformed entrapped gas bubbles for opacified paint films although 100% gas bubbles can give fair opacification or opaque films.

Typical opacifying pigments include rutile titania, anatase titania, titanium calcium, lithopone, and white lead. Most prominent of these now is rutile titania, and the use of this can be reduced a great deal and in some instances eliminated without sacrificing practical opacification while gaining superior curability in the instant process. Zinc oxide is also opacifying, but is not considered as deleterious to cure under ultraviolet irradiations as are the foregoing pigments. Other mineral solids that can be used in the film are more of a filler or extender type such as mica, talc, silica, or clay. They are often added in as extenders and also to provide desirable physical properties in both the wet and dry films. The proportion of these often can be reduced in formulations for use in the instant process without sacrificing opacification also, but this invention is directed primarily to reducing the ultraviolet curing speeds and eliminating wasted ultraviolet energy as well as in reducing or eliminating conventional opacifying pigments such as a titania.

Because in many instances the curing operation here can be performed at quite low temperature (between about 30° and 300°F) and advantageously between ordinary room temperature and about 180°F), and the speed of curing is very rapid, fairly delicate substrates can be used, when the curing is done by ultraviolet light energy. Many typical binders are in fluent liquid form at ordinary operating temperatures and, thus the paint made therewith can be applied by conventional means such as roller, brush, sprayers including electrostatic sprayers.

In general the useful binders are those binders which are curable by free-radical induced addition polymerization using peroxy or azo catalysis or a redox system. The binders can be those wherein the ultraviolet energy radiation causes generation of a catalytic material or effects a rearrangement which starts polymerization that continues until a usefully cured surface coating film results. The binders can be polymeric, monomeric, or a mixture, and are polymerizable by free radical induced addition polymerization when irradiated with ultraviolet energy radiation, especially those exhibiting polymerizable vinyl, acrylic, allylic, mercaptan, fumaric, maleic or like functionality. Reactive polymer types include unsaturated polyesters, acrylics, epoxies, urethanes, isocyanates, and silicones. Reactive monomer types include a variety of acrylates such as hydroxyethyl, cyclohexyl, hydroxypropyl, 2-ethylhexyl, benzyl, phenoxyethoxy, lower alkoxyethoxy, tetrahydrofurfuryl and the like. Other types include N-vinyl pyrrolidone, vinyl acetate, styrene, and the substituted styrenes.

Efficient ultraviolet polymerization of the binder can be promoted by the inclusion of various ultraviolet sensitizers such as benzoin, benzoin ethers, oxime esters, phosphines, sulfonyl halides, and benzophenone derivatives. At least about 0.5% and preferably between about 1 to 5% ultraviolet sensitizer is added to the polymer to achieve efficient cure.

Typical paint film thicknesses can be from about 0.1 or less to as high as about 10 mils or even greater. Most generally paint films are from about 0.2 mil up to about 5 mils. Preferred films are continuous although decorative or specialty films can be applied.

Typically the coated workpieces for curing are passed transversely to the beam of ultraviolet energy radiation by means of a conveyor if the substrate is piece goods, or as a continuous strip is the substrate being coated represents self-supporting stock, such as coil stock. It is sometimes advantageous for completeness of cure and speed of curing to maintain a substantially inert atmosphere about the workpieces during ultraviolet irradiation, that is, a purge of nitrogen or other inert gas. It is sometimes desirable to induce fusion or flow into a coating and then follow with ultraviolet polymerization cure in accordance with this invention. Flow out can be achieved by first heating the coating or substrate by a conventional method such as convection, electrical induction, a laser or other source of infrared energy, and thereafter follow with ultraviolet energy radiation. Accordingly, coatings such as polymerizable powder coatings contain entrapped gas bubbles therein, then can be cured effectively to yield smooth, continuous films.

The following examples show ways in which this invention can be practiced, but should not be construed as limiting it. Unless otherwise specifically stated in this specification, all parts herein are parts by weight, all percentages are weight percentages, and all temperatures are in degrees Fahrenheit.

EXAMPLE 1

A polymerizable binder consisting of equal parts of 2-hydroxyethylacrylate, diglycidyl ether of bisphenol-A diacrylate, and trimethylolpropane triacrylate was ground with sufficient $TiO_2$ to make a pigment-binder (P/B) ratio of 0.8/1. To this pigmented binder composition was added 1% thioxanthone and 3% methyldiethanol amine sensitizer combination. Several 2 mil paint films of the sensitizer composition were applied to a steel test panel and cured as follows:

a. Exposure under nitrogen blanket of 0.2 seconds to a plasma-arc torch (PARS) ultraviolet source gave a thoroughly and completely cured opacified paint film.

b. Exposure to 8,000 watt Ashdee 2 mercury lamp ultraviolet source for ten seconds produced a similar fully cured paint film.

c. Exposure to PARS for 0.1 seconds in the manner set forth in (a) produced an undercured paint film having a surface cure only and no resistance to methyl ethyl ketone (MEK).

d. Exposure to the Ashdee lamp for five seconds in the manner set forth in (b) produced an undercured paint film having a surface cure only and no resistance to MEK.

EXAMPLE 2

A polymerizable binder similar to Example 1 was compounded to provide a ratio of 0.6 $TiO_2$ + 0.2 voids/1 binder. The preformed voids were incorporated into the paint film by the inclusion of glass microspheres or plastic vesiculated particles (polystyrene). The paint films had equivalent opacity to the paint films in Example 1. The ultraviolet sensitizer was the combination in Example 1. Exposure of a 2 mil paint film to ultraviolet sources gave the following results.

a. A paint film containing glass microspheres was exposed to PARS for 0.1 second and resulted in a complete thoroughly cured film having resistance to MEK.

b. A paint film similar to (a) but containing the plastic particles was exposed to PARS for 0.1 seconds and resulted in a completely cured MEK resistant film.

c. A paint film containing glass microspheres and exposed for five seconds to Ashdee ultraviolet source resulted in fully cured MEK resistant films.

d. A paint film containing plastic particles was exposed for five seconds to Ashdee ultraviolet source resulted in a fully cured MEK resistant film.

EXAMPLE 3

A polyester resin is made by reacting 5 mols of propylene oxide with 6 mols of phthalic anhydride and 2 mols of glycidyl acrylate in the presence of 1 mol of water. The resulting resin, 300 parts having Acid Number of 1.6 and 93.3% non-volatile matter in toluene (residual solvent from azeotropic stripping of water), is dissolved in 279.9 parts of hydroxyethyl acrylate monomer. A conventional ultraviolet sensitizer, specifically the butyl and isobutyl ethers of benzoin, is added to the resin solution to give a 2% concentration of such sensitizer.

A wet film of the resulting solution about 0.4 mil thick is spread on a thin, polished aluminum test panel. The resulting clear coating is cured by subjecting the film to ultraviolet energy.

The apparatus for curing is ultraviolet plasma arc radiation torch (PARS) optically directed by a reflector system to irradiate a freshly-painted flat aluminum panel workpiece passing below a rectangular irradiating window on an enclosed, horizontal conveyor moving at 200 feet per minute which provides about 0.1 second of irradiation. The atmosphere around the workpiece during its irradiation is kept essentially inert by purging it with nitrogen. Radiation energy supplied by such apparatus at the workpiece surface is about 35 kilowatts per square foot, with slightly less than about 6 kilowatts per square foot thereof being in the ultraviolet spectrum. Such sort of torch is described in U.S. Pat. No. 3,364,387. The surface of the cured film is not at all tacky, and it has good scratch resistance to the fingernail, indicating good cure throughout the film depth.

EXAMPLE 4

The same sort of sensitized resin as Example 3 was pigmented with about an equal weight of untreated pigmentary rutile titanium dioxide, formed into a film of like thickness on the same kind of workpiece, and irradiated with ultraviolet in the manner set forth in Example 3. The surface of the irradiated paint has a low surface tack, but scratching of the paint film with the fingernail indicates clearly that the film is quite uncured in depth.

EXAMPLE 5

Replacing a portion of the titania in the pigmented paint composition in Example 4 by about an equal volume of tiny, roughly spheroidal, polystyrene granules, such granules estimated to be about 15 microns in average diameter with the vesicles therein averaging about 1 micron in diameter and occupying about half the volume of the granules, substantial opacification of the film is obtained while establishing effective curing similar to that for the clear coating. Exposure to PARS for 0.1 second resulted in a fully cured MEK resistant film.

EXAMPLE 6

A vehicle for a white paint was made by blending 33 parts of bisphenol diepoxide diacrylate, 33 parts of the reaction product of a mol of hexamethylol melamine with 3 mols of hydroxyethyl acrylate and distillation off of methanol leaving about 30% hydroxyethyl acrylate in such reaction product, 15.5 parts diluent cyclohexyl acrylate, and 16.5 parts of additional diluent hydroxyethyl acrylate. An ultraviolet sensitizer (1-phenyl, 1,2-propane dione-2-benzoyl oxime) was added in the proportion of 5%. This non-pigmented clear vehicle cures in coatings of about 1/2 mil thickness using the PARS apparatus described in Example 3, and exposure to PARS for 0.1 second resulted in fully cured MEK resistant paint films.

EXAMPLE 7

A white paint is made by adding to the formulation in Example 6 39.8 parts of clear glass microballoons having particle diameter between about 10 and about 25 microns. The product is a thick paste that can be spread by a doctor blade into a rough film of about 1/2 mil thickness. Said paint film was cured in the manner and apparatus set forth in Example 1 providing a full thorough cure in 0.1 second. Laser ultraviolet irradiation as shown in copending U.S. patent application Ser. No. 189,254, entitled "U.V. Laser-Induced Curing Process for Surface Coatings," filed Oct. 14, 1971, gave similar results.

I claim:

1. In a process for ultraviolet curing of a paint film containing titanium dioxide pigment and an ultraviolet sensitizer, and having an acrylic binder polymerizable by free radical-induced addition polymerization when irradiated with ultraviolet radiation, the improvement which comprises:

providing between about 25 to 90% of the opacification of said paint film by the inclusion of granules to entrap preformed opacifying gas bubbles within said paint film said paint film having a pigment-binder ratio of 0.8/1; and irradiating said paint film with ultraviolet energy radiation until said paint film is cured to a hard paint film.

* * * * *